(12) United States Patent
Firoozye

(10) Patent No.: US 12,219,000 B1
(45) Date of Patent: Feb. 4, 2025

(54) HIERARCHICAL UNIVERSAL DEVICE IDENTIFIER

(71) Applicant: Amazon Technologies, Inc., Seattle, WA (US)

(72) Inventor: Ramin Firoozye, Berkeley, CA (US)

(73) Assignee: Amazon Technologies, Inc., Seattle, WA (US)

(*) Notice: Subject to any disclaimer, the term of this patent is extended or adjusted under 35 U.S.C. 154(b) by 196 days.

(21) Appl. No.: 17/364,600

(22) Filed: Jun. 30, 2021

(51) Int. Cl.
*H04L 65/70* (2022.01)
*H04L 67/12* (2022.01)

(52) U.S. Cl.
CPC ............. *H04L 65/70* (2022.05); *H04L 67/12* (2013.01)

(58) Field of Classification Search
CPC ..................... H04L 67/12; H04L 63/0876
See application file for complete search history.

(56) References Cited

U.S. PATENT DOCUMENTS

| | | | | |
|---|---|---|---|---|
| 2010/0065636 A1* | 3/2010 | Byun | ................ | G06Q 10/08 341/1 |
| 2012/0191637 A1* | 7/2012 | Matsunaga | ............ | G06N 5/02 706/47 |
| 2017/0373855 A1* | 12/2017 | Pritchard | ................ | H04L 67/12 |
| 2018/0295133 A1* | 10/2018 | Xu | .......................... | H04L 65/40 |
| 2021/0120090 A1* | 4/2021 | Wang | ...................... | H04L 67/51 |

FOREIGN PATENT DOCUMENTS

WO    WO-2020000042 A1 *   1/2020   ............ G06K 17/00

OTHER PUBLICATIONS

Y. Zhou, Y. Gao, H. Hu and J. Wei, "Research and Implementation of Product's Encoding Intelligent Transformation in Supply Chain," 2009 Second International Conference on Intelligent Networks and Intelligent Systems, Tianjian, China, 2009, pp. 649-652, doi: 10.1109/ICINIS.2009.182. (Year: 2009).*

* cited by examiner

*Primary Examiner* — Caroline H Jahnige

(74) *Attorney, Agent, or Firm* — Davis Wright Tremaine LLP

(57) ABSTRACT

In various embodiments described in the present disclosure, a device identifier is generated based at least in part on a set of values corresponding to a set of fields representing information associated with a device. For example, the set of values are converted to a bitstream which is encoded using an alphabet based at least in part on an encoding schema.

20 Claims, 7 Drawing Sheets

HIERARCHICAL UNIVERSAL DEVICE IDENTIFIER

BACKGROUND

An increasing number and variety of devices are being connected to networks to fulfill user needs. Some of these devices may be objects and machines, such as refrigerators, watches, motion detectors, gauges, sensors, and automobiles that were not previously able to connect to networks. These devices are commonly known as "internet of things" devices. As these devices become more ubiquitous, opportunities may increase for providing new and innovative ways of enabling these devices to interact with each other and other computing devices. However, these devices are often not configured to interact with other devices, especially when these devices are manufactured by different entities, and it can be difficult to add such functionality when these devices are not designed to interact with other devices.

BRIEF DESCRIPTION OF THE DRAWINGS

Various techniques will be described with reference to the drawings, in which.

DETAILED DESCRIPTION

Figure 1:
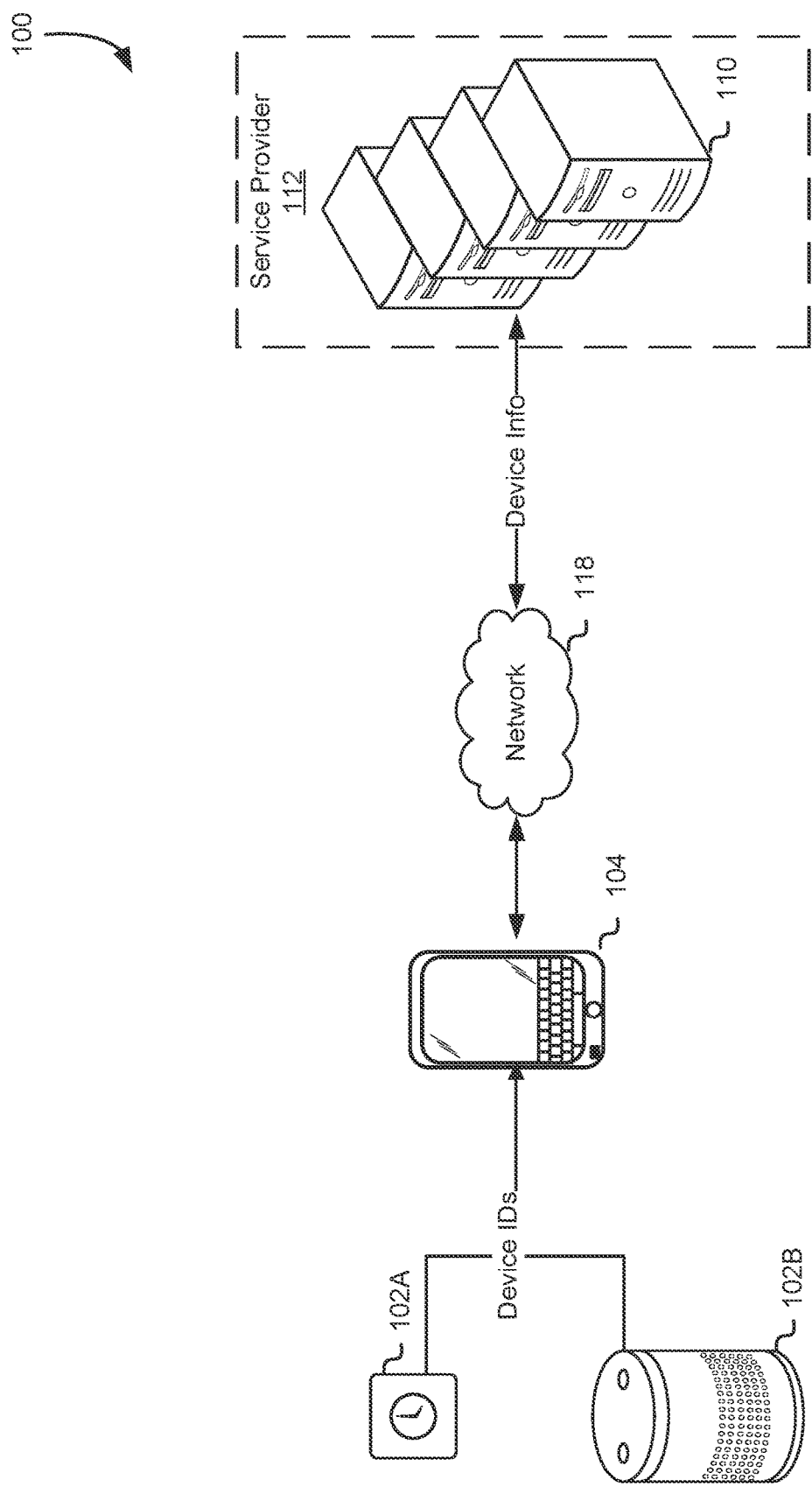
FIG. 1 illustrates an environment in which a universal device identifier enables a device to obtain device information in accordance with an embodiment.

Systems and methods are described for encoding and decoding a hierarchical universal device identifier for uniquely identifying devices and/or components of devices. In one example, an encoding schema utilizes a hierarchical structure for a plurality of fields of the device identifiers. As described in greater detail below, the universal device identifiers, in various implementations, can be assigned to a variety of devices including devices that are capable of exchange data over a network. For example, the encoding schema can define a set of fields of various bit widths representing a variety of information associated with a device (e.g., manufacturer, model, project, components, manufacturing location, batch, date, version, etc.). Furthermore, in an implementation, values associated with particular fields are organized into a bitstream and encoded into a human readable universal device identifier based at least in part on an alphabet. In turn, in such implementations, the universal device identifier can be decoded based at least in part on the alphabet to generate the bitstream which includes the values associated with the particular fields. In various examples, this enables the extraction of data from particular fields (e.g., manufacture information, model number, device name, etc.).

In addition, a data model can be defined to enable sense and control operations with a device using information obtained from the universal device identifier. As described in greater detail below, the universal device identifier, can encode information about entities associated with the device (e.g., manufacturer, cloud service, database, etc.) and components within the device itself (e.g., sensors, data, components, interfaces, etc.) enabling access to specific data elements generated by a specific instance of the device. In one example, a computing device decodes the universal device identifier and, based at least part on information obtained from the decoded universal device identifier, communicates with a service to obtain sense and control information associated with the device. For example, the service can return information indicating data type generated by components of the device (e.g., a temperature sensor) and parameters for communicating with the device. In various implementations, the universal device identifier encoding schema includes the structure for a plurality of slots which are defined within the data model and indicate sense and control for the device.

In one implementation, a service of a computing resource service provider provides a console or similar interface (e.g., application, dashboard, monitoring system, etc.) allowing multiple individual devices and data generated by the devices to be monitored and modified based at least in part on the devices including universal device identifiers. For example, the service can be used to monitor and manage universal device identifier compliant devices without requiring foreknowledge of the device types, data formats, communication protocols, device components, value ranges, and/or other information associated with the device.

In one example, the system and method described in the present disclosure generate a universal device identifier for Internet of Things (IoT) devices and/or objects that can be used to obtain sense and control information for the IoT device and/or objects. Various IoT devices may have a custom communication protocol and/or identification schemes; therefore, in order to be able to manage them and access data generated by IoT devices in a uniform manner, a universal device identifier system enables hardware data elements to be identified down to individual values inside a single instance of an IoT device. In one example, the universal device identifier system enables monitoring of IoT devices in real-time or near real-time.

In an example, the encoding schema includes a taxonomy that defines a plurality of fields of varying widths to represent data. For example, the fields can include version information, entity or organization identifiers, project identifiers, model identifiers, device identifiers, slot identifiers (e.g., various components of the device), and/or other information associated with the device (e.g., manufacturing location, device version information etc.). One or more fields within the device identifier may be omitted if not needed, for example, when determining a manufacturing location, fields corresponding to slots, version, and/or device may be omitted. As described in the present disclosure, the resultant identifier obtained by combining the plurality of fields is then translated into a string value that can then be used to address the individual element. Furthermore, the string value, in various examples, is unique relative to other string values representing other devices within the universal device identifier system.

In one example, an identifier generated in accordance with the universal device identifier system enables, without requiring data outside of the identifier, a determination of a manufacturer, project, model, device, components thereof, and other information associated with a device. In one implementation of the universal device identifier system, the string value representing the universal device identifier is decoded or otherwise reversed to obtain this information. Furthermore, in such implementations, this information is obtained without the need to validate the universal device identifier and/or the information obtained from decoding the universal device identifier.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) providing a mechanism for encoding and decoding data about a wide variety of devices, (2) providing unique human readable identifiers for a wide variety of devices, (3) enabling communications with a wide variety of devices including sense and control operations regardless of underlying communication protocols and systems of the devices, (4) enabling virtual interfaces with a wide variety of devices regardless of device components, communication protocols, and/or interfaces, (5) providing a hierarchical or otherwise structured system for uniquely identifying devices, and (7) enabling the encoding of additional information associated with devices and/or objects for troubleshooting.

FIG. 1 shows an environment 100 for obtaining device information based at least in part on device identifiers obtained from a first device 102A and a second device 102B in accordance with at least one embodiment. In various embodiments, a service 110 of a service provider 112 receives the device identifiers over a network 118 from a computing device 104. The computing device 104, for example, includes a handheld device, a wearable device, a remote sensor, a home appliance, a wireless peripheral, a network addressable camera, a mobile phone, a fixed camera, a dashboard camera, an integrated sensor (e.g., a sensor included in a vehicle or robot), a Light Detection and Ranging (LIDAR) sensor, an infrared sensor, a smart home device, or other computing device capable of obtaining as an input a string value representing the device identifiers. In various embodiments, the first device 102A and the second device 102B includes an Internet of Things (IoT) device that provides some functionality and is connected to the network 118 (e.g., Internet) either directly or indirectly (e.g., through a proxy, gateway, mobile phone, or other device), and includes a device identifier generated in accordance with the universal device identifier system described in the present disclosure. As described in greater detail below, the device identifiers, in an embodiment, include a human readable string value generated in accordance with a hierarchical encoding schema that includes a plurality of fields corresponding to information associated with the first device 102A and/or the second device 102B such as manufacture information, model number, project information, device name, slot information, manufacture date, manufacture location, batch number, version information, device component information, or any other information associated with devices.

In an embodiment, the service 110 is an IP addressable computing resource (e.g., a computer system comprising one or more hardware server computer systems, such as described below in connection with FIG. 7) that supports the ability to directly address or be addressed by other network devices, and which, in an embodiment, initiates a request to one or more computing devices over a network (e.g., the network 118 or other networks such as a service provider network not illustrated in FIG. 1 for simplicity) in response to obtaining a device identifier, a decoded device identifier, and/or a portion thereof. In various embodiments, the computing devices illustrated in FIG. 1, such as the service 110, the computing device 104, the first device 102A, and the second device 102B comprise hardware (e.g., processors, storage devices, and memory) and software stored in the memory that, as a result of execution by one or more processors, causes the various computing devices to perform one or more functions described in the present disclosure, including providing device information based at least in part on device identifiers. For example, the hardware of the first device 102A includes one or more sensors and/or a transmitter (e.g., Bluetooth, WiFi, LoRa, or other radio) to transmit data 108 over the network 118.

Furthermore, the computing devices illustrated in FIG. 1, in an embodiment, communicate with the service provider 112 and/or a component thereof such as the service 110 using Application Program Interface (API) functions. Furthermore, in various embodiments, the first device 102A and the second device 102B include a mechanism for providing device identifiers to the computing device 104. In one example, the device identifier of the first device 102A is imprinted on an outer body of the first device 102A. In another example, the second device 102B includes hardware and/or software that provides the device identifier over a communications channel in response to a query (e.g., the computing device 104 obtains the identifier from the second device 102B using near field communication).

In various embodiments, the network 118 includes a local area network connected to the internet in a home, work, public, or private environment. The network connection to the network 118, for example, is established using a wired or wireless connection. In various examples, a wired connection is established using an Ethernet interface, a USB interface, a FireWire interface, a serial interface, a powerline interface, or a fiber optic interface. In additional examples, a wireless connection is established between the computing device 104, the service 110, and/or the client using a WiFi, Bluetooth interface, or other wireless interface.

The service 110, in various embodiments, is a computer system that connects to objects to construct a network of interconnected devices commonly known as the "internet of things." For example, the service 110 supports obtaining device identifiers from the computing device 104, queries a database or other storage device to obtain device information (e.g., sense and control information), and returns the device information to the computing device 104. The service provider 112, in one example, provides an environment within which one or more applications, processes, services, virtual machines, and/or other such computer system entities are executed to provide one or more computing resources to clients including the computing device 104. In the embodiments described herein, the client includes a person, a process running on one or more remote computer systems, or other computer system entities, users, or processes. The service 110, in various embodiments, includes a plurality of services provided by the service provider 112 which, in combination, provide all or some of the functionality described in the present disclosure. Examples of the services include machine learning for remotely performing training and inferencing of ML models, a data storage service for remotely storing data, a computing resources provisioning service that supports remotely providing computing resources (e.g., virtual machine instantiation, serverless computing, application execution, databases), electronic commerce services, and website hosting services, by way of non-limiting examples.

As described in greater detail below in connection with FIGS. 3 and 4, the device identifier is generated in accordance with the universal device identifier system which includes an encoding schema comprising structure (e.g., bits corresponding to different fields within the device identifiers) that provides additional information corresponding to the device (e.g., the first device 102A and/or the second device 102B). In various embodiments, the bits corresponding to different fields are included in a bitstream (e.g., a binary sequence) and encoded using an alphabet (generally a collection of symbols) that is human-readable to produce a string value. Furthermore, in accordance with the encoding schema used, the different fields can be used to identify aspects and/or information associated with the device and, as illustrated in FIG. 1, can be used to obtain information from the service 110 and/or other systems. In one example, the computing device 104 determines a manufacturer of the first device 102A based at least in part on the device identifier, determines that the service 110 is associated with the first device 102A based at least in part on the manufacturer, and provides model information obtained from the device identifier to the service 110 in order to obtain information indicating how to communicate with the first device 102A from the service 110 based at least in part on the model information.

Although not illustrated in FIG. 1 for simplicity, in some environments (e.g., an industrial or office setting) the first device 102A and/or the second device 102B communicate with a gateway device connected to the network 118. In one example, the first device 102A and/or the second device 102B communicate through a proxy such as a mobile phone. In addition, in various embodiments, the gateway device or similar device maintains data associated with and/or on behalf of the first device 102A and/or the second device 102B. In one example, the first device 102A and/or the second device 102B includes a wearable device (e.g., watch, glass, ring, etc.) and a gateway (e.g., mobile phone) can collect data from the wearable device, such as biometric data, and store the data for an interval of time (e.g., while the service provider 112 is unreachable). Returning to FIG. 1, the first device 102A and/or the second device 102B, in various embodiments, are an instance of a particular model of a device for which a manufacturer has produced a plurality of. In the example illustrated in FIG. 1, the second device 102B includes a model of a smart speaker manufactured by an organization responsible for manufacturing a plurality of that particular model of smart speaker. In various embodiments, fields of a set of fields of the device identifier are associated with an entity (e.g., the organization), a project (e.g., the project within the organization responsible for research and development of the model of the smart speaker), a model (e.g., the model of the smart speaker), a device (e.g., the second device 102B), and slots of the device (e.g., battery sensor, voice control software, microphone, and/or speaker). In various embodiments, the entity and the manufacturer are separate entities. In one example, an organization develops the device, including design of the device and a data model (e.g., sense and control information associated with the device), and the manufacturer produces the device according to the design developed by the organization.

In such embodiments, the device identifier can be used to obtain instances of data associated with the device. Returning to the example above, the device identifier can be used to obtain a battery charge level based at least in part on the device identifier and the slot associated with the battery sensor. As described in greater detail below, a data model, in various embodiments, is defined to describe data obtained from the device (e.g., battery sensor). In one example, the service 110 returns the data model with the device info to the computing device 104 which enables the computing device 104 to determine a battery level from the second device 102B based at least in part on data obtained from the battery sensor referenced in the device identifier. In various embodiments, the device info provided by the service indicates a mechanism for communicating with and/or controlling the device (e.g., a particular model of a device or a particular device itself such as the first device 102A) associated with the device info. In one example, a slot associated with the device is associated with control of the device (e.g., turning the device on or off), the device info associated with the slot indicates that transmitting a particular signal to an addressable component of the device controls the device. In this manner, the universal device identifier system enables systems and/or services to uniquely and unambiguously define attributes of the devices and/or entities associated with the device. In various embodiments, various aspects of the device are anonymized. For example, a location of the device, owner of the device, network address of the device, and other information may be omitted, obscured, encrypted, replaced, or otherwise anonymized.

In one example, a company is assigned an organization identifier of 1000 and has a plurality of projects, including a project responsible for creating a line of clock products (e.g., the first device 102A). In this example, the project is assigned an identifier of 23. Continuing the example, within the project, there are multiple models of devices including a model assigned an identifier of 200. Furthermore, the various identifiers (e.g., organization, project, and model), in an embodiment, are uniquely assigned. In other words, once the company has been assigned the identifier of 1000, no other company or entity is assigned the same identifier in accordance with an embodiment. In various embodiments, the computing device 104 and the service 110 include computer systems as described in greater detail below in connection with FIG. 7.

Returning to the example above, mass production of the model of the device is performed and a plurality of devices are produced including the first device 102A assigned the device identifier of 56231. In various embodiments, firmware or other executable code stored in memory of the model of the device (e.g., model number 200), include a number of attributes and/or slots. For example, the first device 102A includes a slot assigned the identifier of 4 associated with a temperature sensor included in the first device 102A. The first device 102A, in an embodiment, periodically and/or aperiodically transmits data obtained from the temperature sensor to the service 110. As a result, in such an embodiment, the computing device 104 obtains data generated by the temperature sensor by at least obtaining the device identifier from the first device 102A and utilizing the device identifier to poll the service for data associated with the slot assigned the identifier of 4. For example, the device identifier associated with the first device 102A uniquely identifies the value obtained from the temperature sensor for that instance of the device based at least in part on the following string value: "cqSmcIwA3NRpBsPvZ4." As described in the present disclosure, the string value, in various embodiments, is generated by at least combining the various fields of the device identifier (e.g., organization identifier, project, model, device, and slot) to generate a bitstream (e.g., a binary value representing the integer values 1000, 23, 200, and 56231) and encode the bitstream using a particular alphabet (e.g., hexadecimal, base 62, base 58, etc.). In one example, the first device transmits data to update to the service 110, identifying the value using the following pseudocode:

{
"device identifier": "cqSmcIwA3NRpBsPvZ4",
"value": 89.5
}

In this example, under the encoding schema associated with the universal device identifier system, the service 110 decodes the device identifier to obtain data associated with the slot in order to update the temperature data associated with the first device 102A. In an embodiment, the service 110 decodes the device identifier (e.g., the string value "cqSmcIwA3NRpBsPvZ4") to generate data represented by the following exemplary semi-structured data object:

cqSmcIwA3NRpBsPvZ4->
   Version: 0
   Entity: 1000
   Project: 23
   Model: 200
   Device: 56321
   Slot: 4

In the example above, the version information (e.g., "Version: 0") represents a version of the encoding schema used. In various embodiments, different versions of the encoding schema are created for various purposes such as different encoding alphabets, different bit fields, different bit widths, or other reasons. In addition, the version information, in various embodiments, is processed prior to the rest of the device identifier or otherwise separated. In one example, the version information is determined prior to decoding the string value to determine the appropriate alphabet for decoding.

In an embodiment, certain values are omitted to allow for addressing a group of items. For example, by omitting the slot value, the device identifier references a single device instance (e.g., the first device 102A) and can be used as a Universal Product Code (UPC) for that specific instance of the device. In this example, the generated device identifier in accordance with the encoding schema would be "cqSmcIwA3NRpBsPvYY" which is unique to that individual device (e.g., the first device 102A) relative to other devices with device identifiers generated in accordance with the encoding schema. As described in greater detail in connection with FIG. 2, in various embodiments, the device identifiers are converted into a bar-code or Quick Response (QR) code value and used as an identifier on the exterior of the device. In another example, by omitting slot, device, and model fields, the resulting device identifier (e.g., the encoded string value "cqSmcId8yMSkicUjgQ") can be used to access data relevant to Project 23 at Entity 1000. The following example of a semi-structured data object represents the resulting device identifier with the slot, device, and model fields omitted:

cqSmcId8yMSkicUjgQ->
   Version: 0
   Entity: 1000
   Project: 23
   Model: 0
   Device: 0
   Slot: 0

Similarly, in another example, if the device identifier is generated using the entity, project, and model (e.g., omitting the device and slot) the resulting string value represents the model and can be used as a Stock Keeping Unit (SKU). In various embodiments, the universal device identifier system is bi-directional and can be embedded in a range of devices including, but not limited to: automotive devices, embedded systems, entertainment devices, home appliances, industrial automation tools, medical devices, mobile devices, scientific instruments, "smart" devices, toys, transportation equipment, wearables, or other devices capable of communicating information. Furthermore, the universal device identifier system supports directly addressing trillions of devices, and quadrillions of uniquely identifiable data points (e.g., slots) in accordance with various embodiments. In various embodiments, the values are converted to binary values; however, any base or representation of the attributes of the device as values can be used in connection with the present disclosure. For example, the values can be converted to hexadecimal values prior to encoding utilizing the alphabet. Furthermore, in various embodiments, the set of fields correspond to device attribute types. For example, the set of fields indicate attributes of the device such as model, manufacturer, organization, project, batch, construction date, construction location, components, or other attributes of the device.

Figure 2:
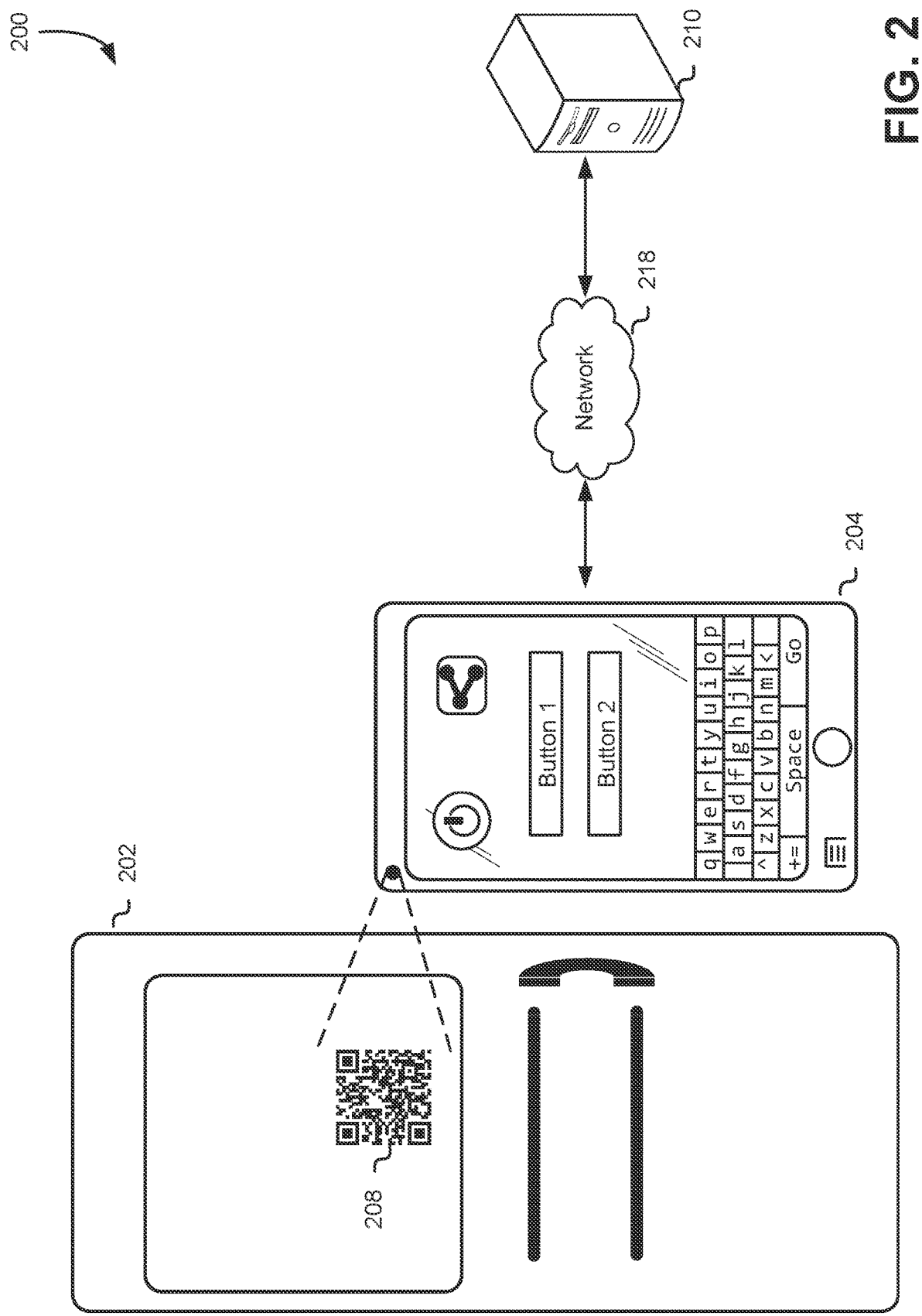
FIG. 2 illustrates an environment in which a universal device identifier enables a device to obtain sense and control information in accordance with an embodiment.

FIG. 2 shows an environment 200 for obtaining a virtual device interface based at least in part on a device identifier obtained from a QR-code 208 included in a device 202 in accordance with at least one embodiment. In various embodiments, a service 210 of a service provider receives the device identifier over a network 218 from a computing device 204. The service 210, computing device 204, the device 202, and the network 218, in an embodiment, include a hardware and/or software as described above in connection with FIG. 1. In one example, the computing device 204 includes a virtual reality headset or augmented reality glasses.

In the example illustrated in FIG. 2, the computing device 204 includes a camera that captures the QR-code 208, the computing device 204 then obtains, from the QR-code, the device identifier associated with the device 202. As described above, the device identifier (e.g., a string value) generated in accordance with an encoding schema on the universal device identifier system can be encoded in a bar code, QR-code, or other machine-readable information. In various embodiments machine-readable information includes various mechanisms for communicating information to a device using one or more sensors. In one example, the device identifier is encoded into a Near-Field Communication (NFC) chip or Radio-frequency identification (RFID) tag. Other examples of such mechanisms, radio waves, sounds waves, vibrations, visible features (e.g., edges, shapes, identifying marks), electromagnetic radiation, and/or other mechanisms suitable for transmitting data. In an embodiment, the computing device 204 scans the QR-code 208 and locally (e.g., without communicating with other devices) determines information associated with the device 202 (e.g., a type of device, model information, manufacturer, etc.). In an embodiment, the device identifier is unique relative to other device identifiers. For example, an organization identifier included in the encoding schema is unique relative to other organization identifiers, a project identifier included in the encoding schema is unique relative to other project identifiers, a model identifier included in the encoding schema is unique relative to other model identifiers, a device identifier included in the encoding schema is unique relative to other device identifiers, and, as a result, the corresponding device identifier generated by encoding the combination of identifiers (e.g., organization, project, model, and device) is unique.

In various embodiments, the computing device 204 decodes the device identifier encoded in the QR-code 208 and transmits the device identifier or a portion thereof over the network 218 to the service 210. In one example, the decoded device identifier includes a set of integer values corresponding to a set of fields. As described in greater detail below in connection with FIG. 3, the fields can include a version number, entity identifier, project number, model number, device identifier, and slot number in accordance with at least one embodiment. For example, the string value extracted from the QR-code is decoded into a bitstream (e.g., a string of '1' and '0') and bit values are determined for the corresponding fields (e.g., bits 0-3 encode the version number, bits 4-8 encode the entity identifier, etc.). In such examples, the bit values are converted to integer values and structured as described above in connection with FIG. 1. In various embodiments, the conversion of integer values to binary values includes encoding the integers as binary values in accordance with an encoding schema. Such an encoding schema can be used to encode attributes of the device (e.g., organization, model, project, slot, etc.) from a first representation (e.g., integer values) to a second representation (e.g., binary values) suitable for encoding by the alphabet.

While QR codes are used for the purpose of illustration, it should be noted that other mechanisms can be used to obtain a device identifier, such as via other optical encodings of data (e.g., barcodes, matrix barcodes, character strings, and/or images that utilize steganographic techniques), via non-optical techniques (e.g., radio frequency identification (RFID)), via audio, or combinations of the foregoing.

In an embodiment, the identifier or portion thereof (e.g., model number and/or device identifier) is transmitted to the service 210, for example, in an appropriately configured API call. In response, the service 210 provides the computing device with a data model or other information defining communication with the device 202 in accordance with an embodiment. In this manner, the device 202 and/or computing device are not required to store this information and can therefore be decoupled in such embodiments to enable a plurality of devices to communicate without being preconfigured. In various embodiments, the information returned from the service 210 indicates slots associated with the device configured for sense and control. For example, as described in greater detail below in connection with FIG. 4, a data model defines a set of slots including data types, data, parameters, and other information useable to communicate with the device 202. In one example, the data model indicates slot 2 is associated with command and control of the device 202 that causes the device 202, in response to a particular parameter, to turn on and off. Similarly, as illustrated in FIG. 2, the data model may indicate a plurality of slots and parameters for interacting with the device 202 and the computing device 204 can display an interface for interacting with the device 202.

In various embodiments, the interface enables remote communication and control with the device 202. For example, the computing device 204 can communicate with the device 202 (once the device identifier has been used to obtain device information from the service 210) and request data (e.g., values) associated with particular slots. In addition, the computing device 204, in an embodiment, determines the current state of the device 202 based at least in part on data obtained from the device 202 and the data model. For example, the data model defines slot 3 as an integer value indicating a pressure value measured by a pressure sensor of the device 202, the computing device 204 may then query the device 202 for the integer value associated with slot 3 to determine the current state of the pressure sensor. In another example, the computing device 204 transmits a command to the device 202 by at least transmitting a particular value (e.g., the character 'O' or 'X' corresponding to on or off) to a particular slot and/or address associated with the particular slot.

Although the environment 200 illustrated in FIG. 2 includes a service 210, in various other embodiments, the computing device 204 includes instructions and/or other data that enables the operations described without needing to communicate with other entities. For example, the computing device 204 can decode the device identifier and determine, based at least in part on data stored within the computing device 204, how to communicate with the device 202. In an embodiment, the information indicating how to communicate with the device 202 includes information indicating a communication protocol and/or mechanisms for communicating with the device 202. In one example, the information indicates a wireless network and/or communication protocol for establishing a connection with the device 202.

As illustrated in FIG. 2, the buttons (e.g., "button 1," "button 2," a power button, and/or other buttons), in an embodiment, are associated with slots as defined in the data model and are useable to obtain data from the device 202 and/or transmit commands to the device 202. For example, the device 202 includes source code or other instructions that cause the slots to be addressable and, as a result, when the device 202 obtains a command indicating a particular slot (e.g., in response to a button press on the interface of the computing device 204) the device 202 provides the appropriate response. In one example, "button 1" is a start/stop button and an interaction with the button causes the computing device 204 to send a command to the device 202 indicating the corresponding slot and including a parameter that, in response to being received by the device 202, causes the device 202 to start or stop an operation. In various embodiments, the device information obtained from the service 210 or other entity includes a description of the slots and corresponding data types and/or operations. For example, the device info includes a description of each button displayed in the interface and the types of parameters and/or values a particular slot may accept and/or provide.

Figure 3:
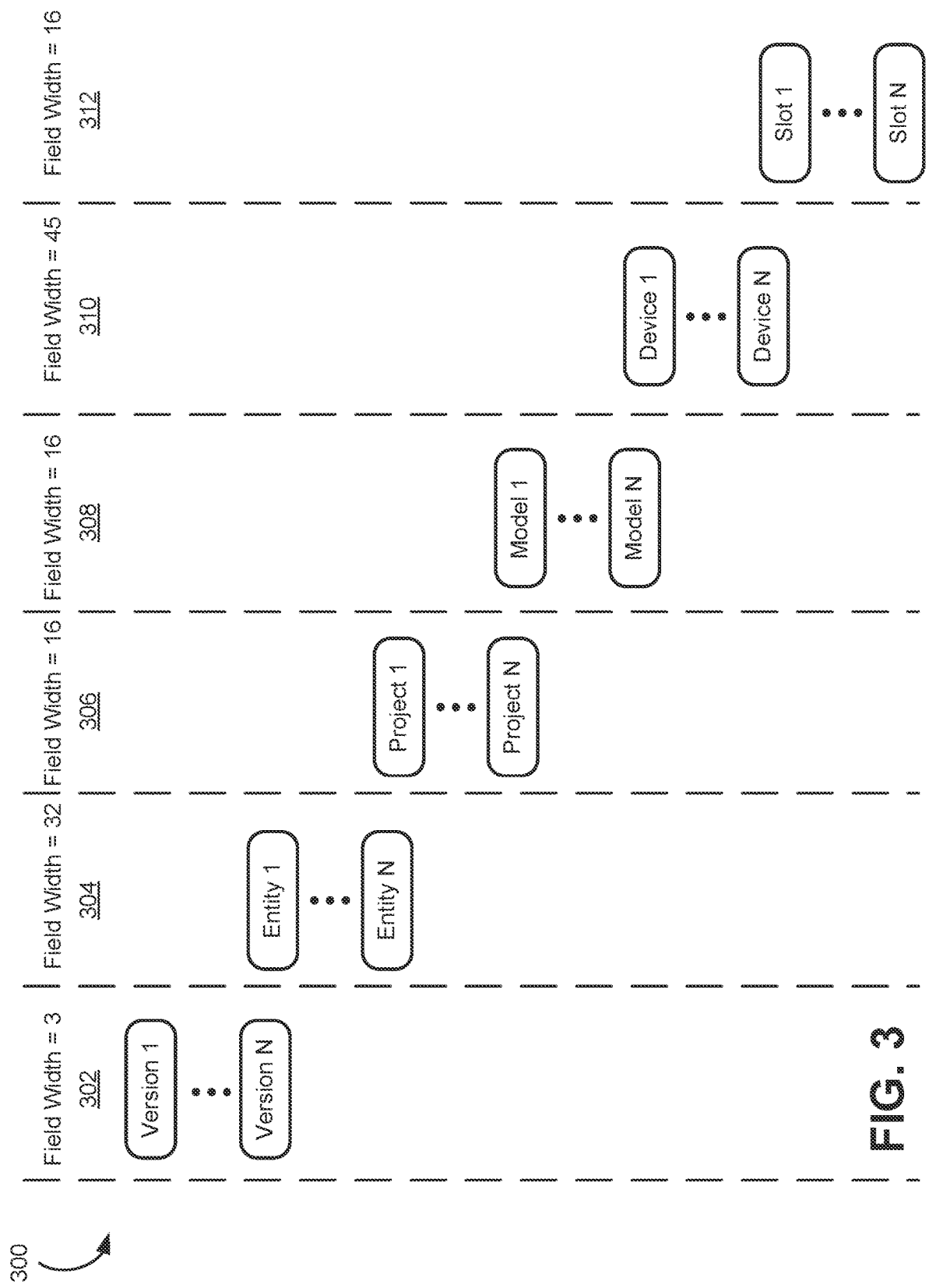
FIG. 3 is a diagram illustrating an encoding schema for a universal device identifier in accordance with an embodiment.

FIG. 3 is a diagram illustrating an encoding schema 300 for a universal device identifier in accordance with an embodiment. As illustrated in FIG. 3, the encoding schema 300 includes a version field 302, an entity field 304, a project field 306, a model field 308, a device field 310, and a slot field 312. In an embodiment, the encoding schema 300 defines a 256-bit wide bitstream with six fields of various widths (e.g., a version field with a field width of three bits). For example, the version field 302 of width 3 defines the total number of possible versions (e.g., 23=8) as illustrated in FIG. 3 as "Version 1" to "Version N." Furthermore, an integer value, in various embodiments, is used to represent the version number and is converted to a binary value for use in the encoding schema 300. For example, version number 1 can be converted to the binary value of 001 within the 3-bit width of the version field 302. In various embodiments, this same process of converting integer values to binary values to create a bitstream is used for all of the fields included in the encoding schema 300. In addition, the encoding schema 300, in various embodiments, includes any number of fields with any number of bit widths. Furthermore, the encoding schema 300, in various embodiments, includes an extended version with additional bit width.

In various embodiments, a stream of bytes (e.g., a bitstream generated by converting an integer value for each field into binary values) is mapped to a string using an alphabet. The alphabet, in various embodiments, includes any binary-to-text encoding schema such as American Standard Code for Information Interchange (ASCII), ASCII85, Base64, Base85, Base62, Base58, Base36, Base32, Bech32, BinHex, Hexadecimal, Multipurpose Internet Mail Extensions (MIME), Unicode or any other binary-to-text encoding. In various embodiments, a particular alphabet is selected based on various factors such as string length (e.g., fewer characters in the alphabet may require a longer string to encode any particular bitstream), human readability (e.g., certain characters may be difficult for humans to differentiate), or other factors.

In various embodiments, the version information recorded in the version field 302 indicates the alphabet used to encode the bitstream. Furthermore, in various embodiments, the version information recorded in the version field indicates the bit widths and the set of fields included in the encoding schema 300. In one example, version 1 of the encoding schema 300 includes a project field with a 16-bit width, while version 2 of the encoding schema 300 includes a project field with an 8-bit width. In another example, version 1 of the encoding schema 300 includes a model field, while version 2 of the encoding schema 300 includes a batch field.

In yet other embodiments, the encoding schema 300 is used to represent other objects. In one example, the encoding schema 300 represents a multiplayer online game including references to items within the game environment. In addition, the encoding schema 300, in various embodiments, is embedded within source code or other instructions that, as a result of being executed by a computing device, cause the computing device to implement the encoding schema 300.

In other embodiments, the fields include, in addition to or in replacement of the field illustrated in FIG. 3, manufacturing location, manufacture dates, lot information, batch, or other information that is suitable for determining recalls and/or otherwise troubleshooting issues with objects associated with an identifier generated in accordance with the encoding schema 300. In various embodiments, the bitstream is generated by at least concatenating the version field 302, the entity field 304, the project field 306, the model field 308, the device field 310, and the slot field 312 to generate a 256-bit bitstream. For example, an integer value of 1 to be included in the device field 310 is converted to a 45-bit long binary value and concatenated or otherwise combined with the remaining fields defined by the encoding schema 300. As such, in various embodiments, the bitstream is encoded irrespective of the fields defined in the encoding schema. However, in such embodiments, as a result of this process being reversible, the bitstream can be obtained by decoding using the same alphabet and the values associated with the fields can be obtained by converting the bit indicated in the encoding schema 300 (e.g., bits 0-2 correspond to the version field 302).

Figure 4:
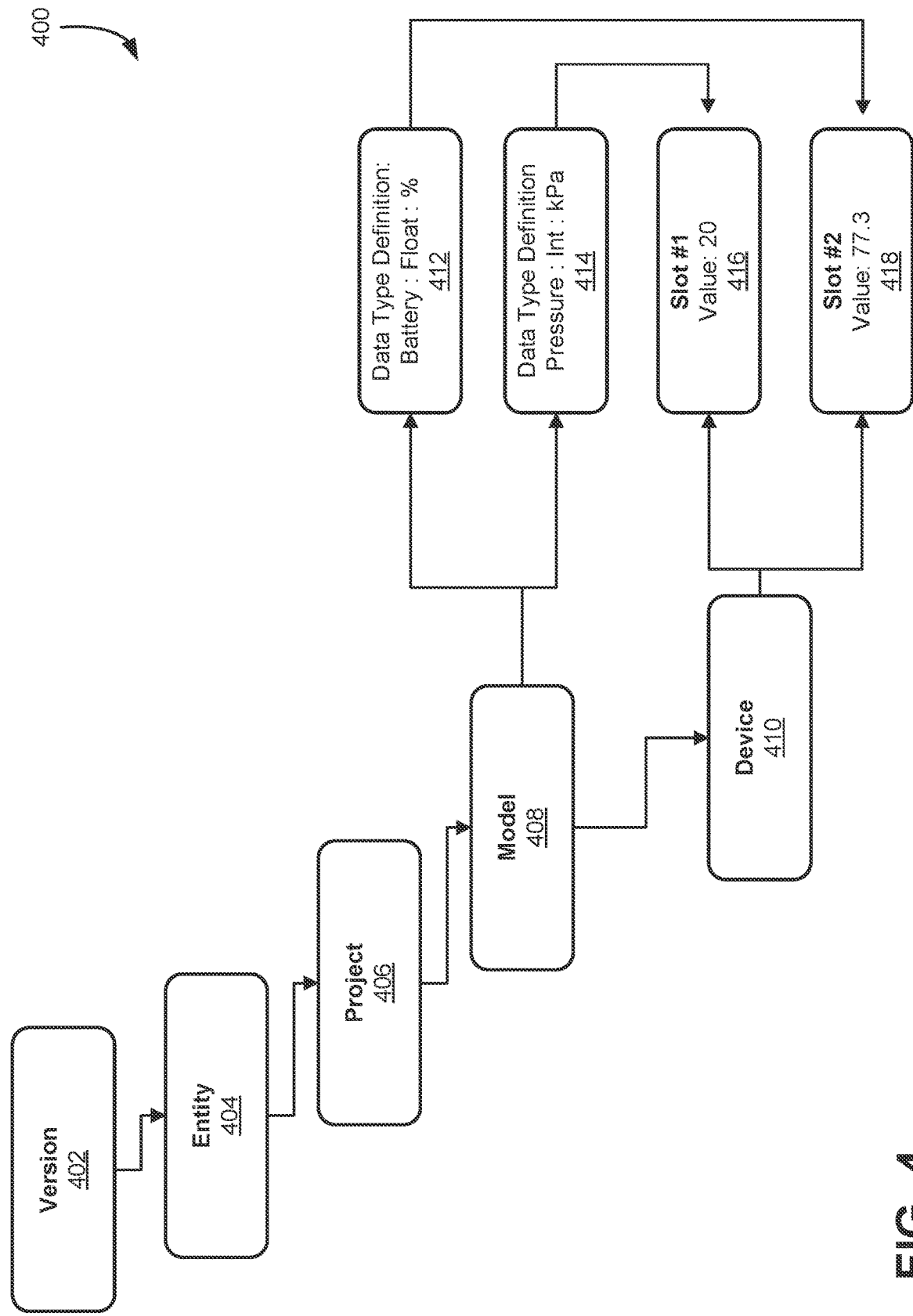
FIG. 4 is a diagram illustrating a data model for sense and control data associated with a universal device identifier in accordance with an embodiment.

FIG. 4 is a diagram illustrating a data model 400 for sense and control data of a device associated with a universal device identifier in accordance with an embodiment. As described above in connection with FIG. 3, the universal device identifier system, in various embodiments, includes an encoding schema that defines one or more fields of device identifiers generated in accordance with the encoding schema. For example, the encoding schema includes a field associated with slots of devices associated with device identifiers. As illustrated in FIG. 4, the encoding schema includes a version field 402, an entity field 404, a project field 406, a model field 408, a device field 410, and slot fields (e.g., "slot #1" 416 and "slot #2" 418). In addition, in various embodiments, the data model 400 defines various attributes from one or more fields of the encoding schema.

In various embodiments, the data model 400 indicates that the model 408 includes various data type definitions 412 and 414. The data type definitions 412 and 414, for example, represent data generated by sensors or other components of the device 410. In one example, the data type definition 412 indicates a data type "battery" (e.g., a battery sensor of the device 410) and a format "float" (e.g., a floating point value is returned from the battery sensor). Furthermore, the data model 400 indicates that the data type definition 412 is associated with "slot #2" 418 in accordance with an embodiment. For example, the data model 400 indicates to a computing device that, when communicating with the device 410 assigned to a particular device identifier generated based at least in part on the encoding schema, the value "77.3" is a floating point value captured by the battery sensor.

In various embodiments, slots may be added or removed. For example, a light sensor or humidity sensor is added to a particular device, as a result, a new model 408 of the device 410 is added to the data model 400. As described in the present disclosure, the fields illustrated in FIG. 4 may include bit fields of various widths that when combined into a bitstream can be encoded to generate a string value that can be decoded back into the bitstream and corresponding bit fields. In various embodiments, encoding and decoding device identifiers generated in accordance with the encoding schema can be described by the following pseudo-code:

```
def base_encode(num, alphabet):
    if num == 0:
        return ENCODING_SCHEME[alphabet] + alphabet[0]
    arr = [ ]
    base = len(alphabet)
    while num:
        rem = num % base
        num = num // base
        arr.append(alphabet[rem])
    arr.reverse( )
    return ENCODING_SCHEME[alphabet] + ''.join(arr)
def base_decode(string):
    encoding_scheme = string[0:1]
    remainder = string[1:]
    alphabet = REVERSE_ENCODING_SCHEME[encoding_scheme]
    base = len(alphabet)
    strlen = len(remainder)
    num = 0
    try:
        idx = 0
        for char in remainder:
            power = (strlen - (idx + 1))
            num += alphabet.index(char) * (base ** power)
```

-continued

```
            idx += 1
        except ZeroDivisionError:
            pass
        return num
    def to_udi(alphabet=ALPHABET, version=0, entity=0, project=0,
model=0, device=0, slot=0):
        udi_format   =   f"uint:{VERSION_WIDTH},
uint:{ENTITY_WIDTH}, uint:{PROJECT_WIDTH},
uint:{MODEL_WIDTH}, uint:{DEVICE_WIDTH},
uint:{SLOT_WIDTH}"
        bitstream = pack(udi_format, version, entity, project, model,
device, slot)
        intvalue = bitstream.uint
        benc = __base_encode(intvalue, alphabet)
        return benc
    def from_udi(value):
        udi_format   =   f"uint:{VERSION_WIDTH},
uint:{ENTITY_WIDTH}, uint:{PROJECT_WIDTH},
uint:{MODEL_WIDTH}, uint:{DEVICE_WIDTH},
uint:{SLOT_WIDTH}"
        encoding = value[0:1]
        alphabet = REVERSE_ENCODING_SCHEME.get(encoding,
None)
        if not alphabet:
            print(f"ERROR: unrecognized encoding scheme: '{encoding}'")
            exit(1)
        binvalue = __base_decode(value)
        bitstream = BitStream(uint=binvalue, length=TOTAL_WIDTH)
        values = bitstream.unpack(udi_format)
        version = values[0]
        entity = values[1]
        project = values[2]
        model = values[3]
        device = values[4]
        slot = values[5]
        return alphabet, version, entity, project, model, device, slot
```

Furthermore, in various embodiments, instructions defining the encoding and decoding are embedded in the firmware or other executable code. Furthermore, various automated tools can be used to generate source code based at least in part on the encoding schema and/or data model 400 as described in the present disclosure. For example, the automated tools can be used to generate database fields, storage nodes, virtual computing systems, and other entities based at least in part on the encoding schema and/or data model 400. In various embodiments, device identifiers generated by at least encoding values corresponding to the set of fields lacks one or more or all of the values. Furthermore, in an embodiment, the bits of the bitstream used to obtain a symbol of the alphabet can come from a plurality of fields of the set of fields. In addition, the decoding of the device identifiers is performed without the need to decrypt the device identifiers in accordance with an embodiment. In one embodiment, a plurality of values can be obtained from the device identifier without additional information (e.g., a cryptographic key).

Figure 5:
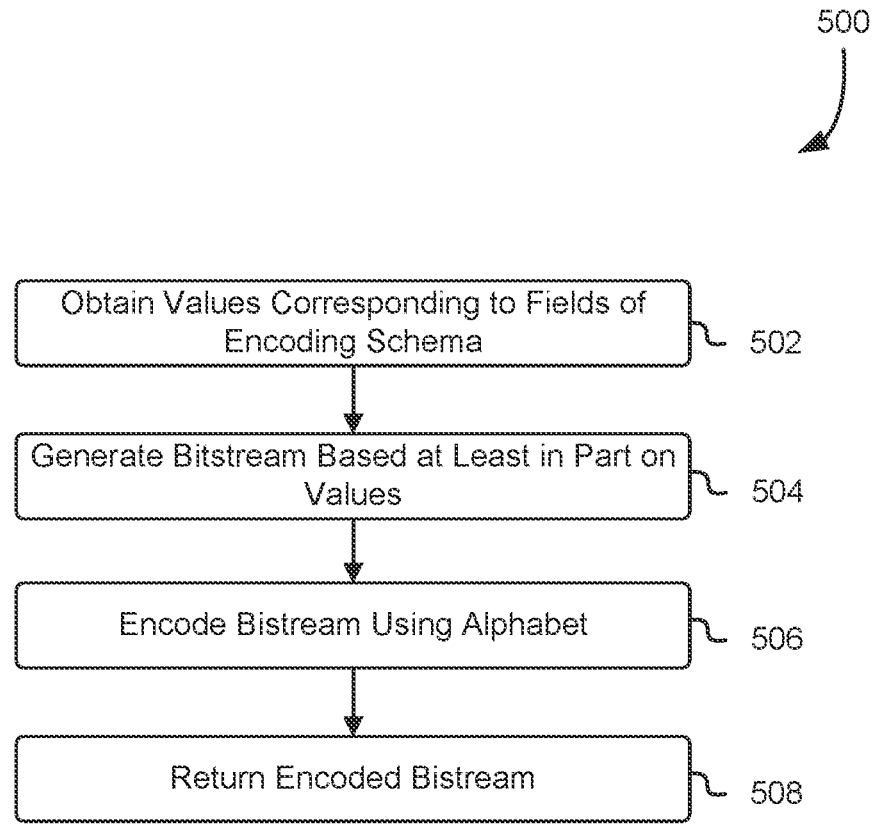
FIG. 5 illustrates a process for encoding a universal device identifier based at least in part on an encoding schema in accordance with an embodiment.

FIG. 5 shows a process 500 for encoding a device identifier in accordance with an embodiment. In various embodiments, the device identifier represents a device and/or object as described above. For example, the device includes an IoT device connected to a network. As described above, the device identifier is encoded in accordance with the encoding schema to generate a device identifier that is unique relative to other devices encoded in accordance with the encoding schema. In one embodiment, a device identifier enables communication with the device based at least in part on device information obtained from the device identifier. In yet other embodiments, portions of the device identifier are omitted to determine other information associated with the device such as model number and/or manufacturer.

Figure 6:
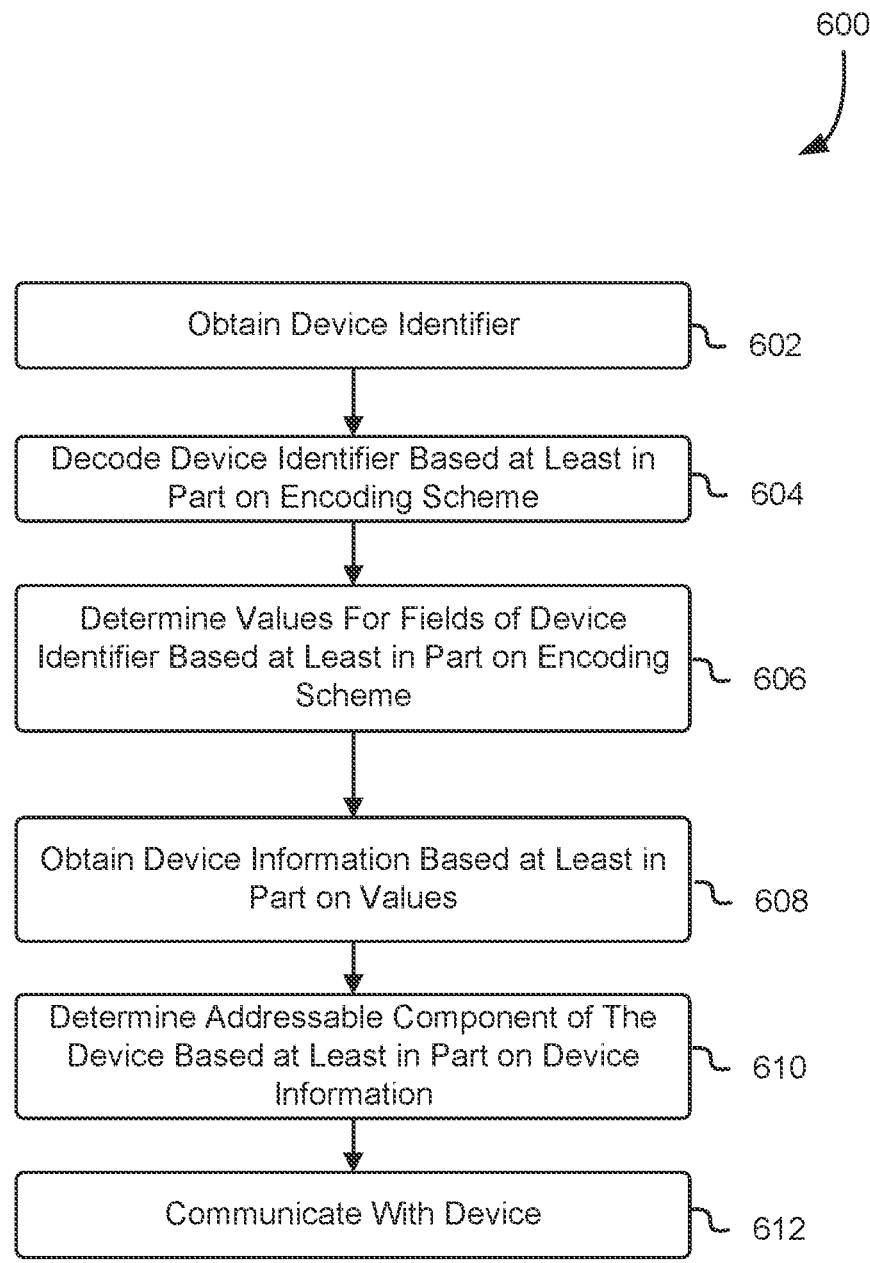
FIG. 6 illustrates a process for decoding a universal device identifier based at least in part on an encoding schema in accordance with an embodiment.

Now referring to FIGS. 5 and 6, the block of processes 500 and 600, described in the present disclosure, in various embodiments, include a computing process that is performed using any combination of hardware, firmware, and/or software. The various functions, processes, and/or operations described in the present disclosure may be carried out by a processor executing instructions stored in memory. In one example, a computing device generates a device identifier for a particular device based at least in part on information associated with the device. The processes, for example, are embodied as computer usable instructions stored on computer storage media. In addition, in some embodiments, the processes are provided by a standalone application, a service or hosted service (standalone or in combination with another hosted service), or a plug-in to another product, to name a few. In addition, the processes 500 and 600, are described, by way of example, with respect to the computer system of FIG. 7. However, these processes may additionally or alternatively be executed by any one system, or any combination of systems, including, but not limited to, those described in the present disclosure. In addition, various blocks of the processes may be performed in different and/or alternative orders, performed in serial or parallel, or omitted entirely.

Returning to FIG. 5, the process 500, at block 502, includes obtaining values corresponding to fields of an encoding schema. In one example, the encoding schema includes an entity field, a project field, a model field, a device field, and a slot field with corresponding integer values. For example, for a particular device, an entity associated with the device (e.g., the manufacturer) is assigned a value of 2135. In such an example, the value obtained from the entity field of the encoding schema would be 2135. At block 504, the system executing the process 500, generates a bitstream based at least in part on the values. In an embodiment, the values are converted to binary values and concatenated to generate the bitstream. For example, the encoding schema indicates that a model field is 16 bits wide and the device field is 45 bits wide, the system executing the process 500 converts the value obtained corresponding to the model field to a 16-bit binary number (e.g., include leading zeros) and the value obtained corresponding to the device field to a 45-bit binary number and combines the 16-bit binary number with the 45-bit binary number to generate the bit stream.

At block 506, the system executing the process 500, encodes the bitstream using an alphabet. As described above, the alphabet, in various embodiments, is defined in the encoding schema and selected based on various factors such as string length and human readability. Furthermore, in an embodiment, the alphabet defines a binary-to-text conversion. For example, for a particular alphabet the binary value '1' is translated to the character 'a.' At block 508, the system executing the process 500, returns the encoded bitstream. In an embodiment, the encoded bitstream includes a string value of human readable characters that represents the device identifier corresponding to the values obtained at block 502. The string value, for example, can then be imprinted on the device and/or converted to a QR-code.

FIG. 6 shows a process 600 for communicating with a device based at least in part on device information obtained using a device identifier in accordance with an embodiment. At block 602, the system executing the process 600, obtains a device identifier. As described above, the system executing the process 600, in an embodiment, includes a camera to capture the device identifier. In yet other embodiments, a user enters the device identifier into an interface. Furthermore, the device identifier, in an embodiment, includes a string value generated by at least encoding a binary value using a particular alphabet. In one example, decoding the device identifier includes converting the string value to a binary number based at least in part on the alphabet. In other words, in such examples, decoding the device identifier includes reversing the process of encoding the device identifier. At block 604, the system executing the process 600, decodes the device identifier based at least in part on an encoding schema. In various embodiments, the encoding schema is standardized for a universal device identifier system utilized to generate the device identifier. In yet other embodiments, a first number of bits of the device identifier indicates version information and/or the encoding schema.

At block 606, the system executing the process 600, determines a set of values corresponding to a field of the device identifier based at least in part on the encoding schema. In an embodiment, decoding the identifier generates a binary value of a width defined by the encoding schema, values for the field are then determined based at least in part on the corresponding width for the field as defined in the encoding schema. For example, if the encoding schema defines bits 180-196 of the bitstream as corresponding to the model number, the system executing the process 500, determines the value for the model number by at least converting the binary value of bits 180-196 to an integer value. At block 608, the system executing the process 600, obtains device information based at least in part on the values. For example, as described above, the system executing the process 600, transmits the values or a portion thereof to a service to obtain device information. In one example, values for a manufacturer and model are obtained based at least in part on the encoding schema and a service associated with the manufacturer is queried using an API call including the model number.

At block 610, the system executing the process 600, determines an addressable component of the device based at least in part on the device information. For example, a data model included in the device information indicates one or more sense and control slots associated with the device. In various embodiments, the addressable component includes an address of the device and one or more parameters for communicating with the device.

Furthermore, communication with the device may be performed directly (e.g., through a wired or wireless connection to the device) or indirectly (e.g., through a gateway, proxy, or other device). At block 612, the system executing the process 600, communicates with the device. In one example, the system executing the process 600 obtains data from the device. In another example, the system executing the process 600 transmits a command to the device to perform an operation.

Figure 7:
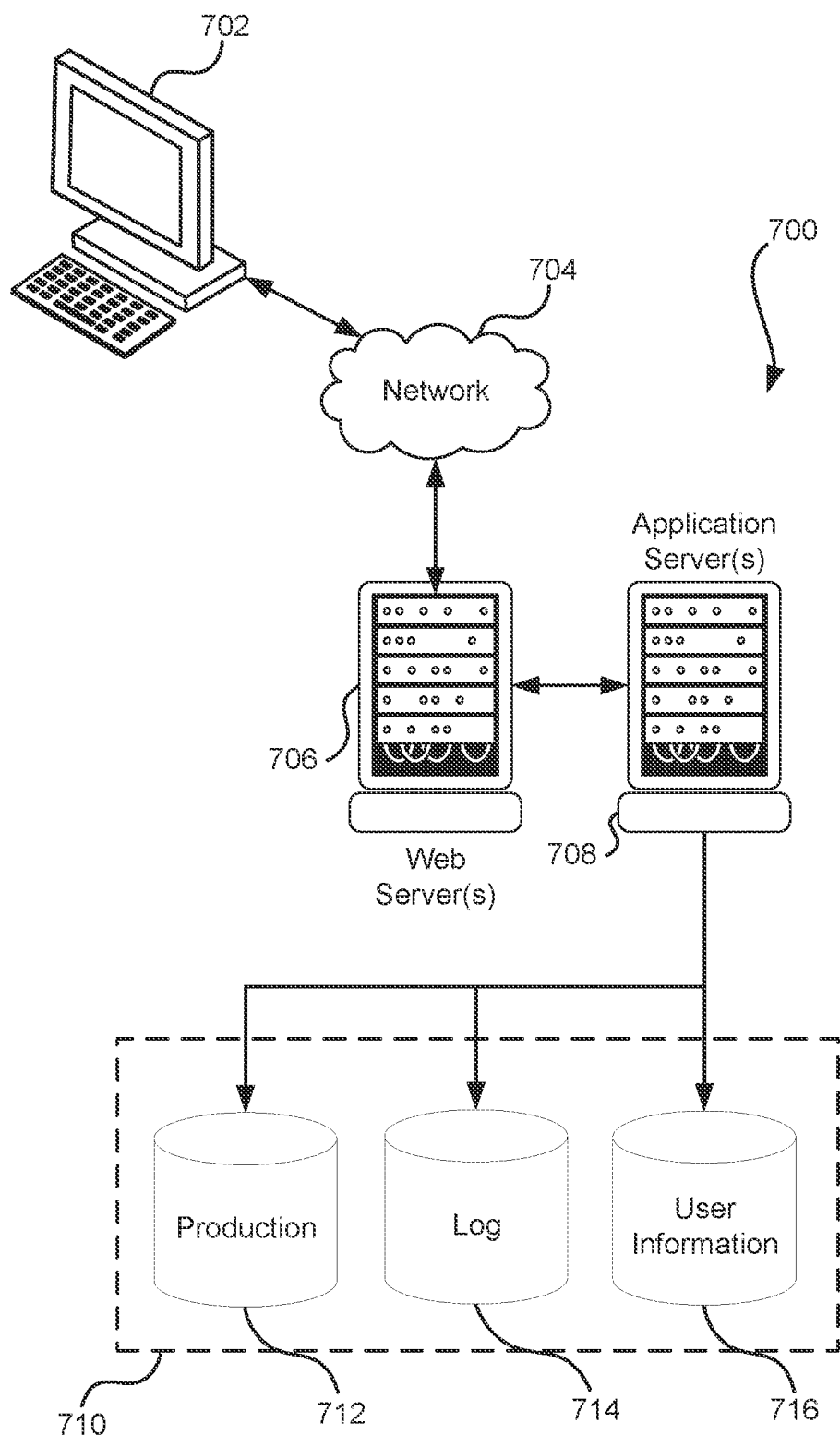
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood. however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C,"

(i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining a plurality of values corresponding to a plurality of respective device attribute types of an encoding schema, the encoding schema organizing the plurality of device attribute types hierarchically, wherein at least one value of the plurality of values indicate a version of the encoding schema;
   generating a bitstream based at least in part on the plurality of values;
   reversibly converting the bitstream to a human-readable identifier by at least assigning different subsets of the bits to symbols in an alphabet that is selected within the encoding schema based, at least in part, on human readability;
   associating in a database the human-readable identifier with a device; and
   in response to receiving information that indicates the human-readable identifier, cause data generated by at least one component of the device to be modified based, at least in, part on the response indicating the human-readable identifier.

2. The computer-implemented method of claim 1, wherein the plurality of respective device attribute types include at least one field associated with a version identifier, an entity identifier, a project identifier, a model identifier, a device identifier, or a slot identifier.

3. The computer-implemented method of claim 1, wherein the plurality of values further comprise integer values representing information associated with the plurality of respective device attribute types.

4. The computer-implemented method of claim 3, wherein an integer value corresponding to a first device attribute type of the device attribute types represents an entity responsible for manufacturing the device.

5. A system, comprising:
one or more processors, and
memory that stores computer-executable instructions that are executable by the one or more processors to cause the system to:
obtain a device identifier associated with a device, the device identifier comprising a set of values of an alphabet that is selected within a schema based, at least in part, on human readability;
decode the device identifier to obtain a bitstream;
determine, from a subset of bits of the bitstream, a version of the schema that is associated with a device attribute of a set of device attributes;
determine the set of device attributes of the device based, at least in part, on the version; and
cause data generated by at least one component of the device to be modified based, at least in part, on receiving an indication of an attribute of the set of device attributes.

6. The system of claim 5, wherein the instructions to cause the system to cause data generated by at least one component of the device to be modified further include computer-executable instructions that, as a result of being executed by the one or more processors, cause the system to:
determine, based at least in part on a first subset of bits of the bitstream, an addressable component of the device; and
communicate with the addressable component of the device based at least in part on a second subset of bits of the bitstream.

7. The system of claim 6, wherein the first subset of bits of the bitstream represents an organization associated with the device.

8. The system of claim 6, wherein the second subset of bits of the bitstream represents a slot associated with the device and defined in a data model.

9. The system of claim 5, wherein the memory further includes computer-executable instructions that, as a result of being executed by the one or more processors, cause the system to determine sense and control information defined in a data model associated with the device based at least in part on the set of device attributes.

10. The system of claim 9, wherein the memory further includes computer-executable instructions that, as a result of being executed by the one or more processors, cause the system to transmit a command to the device based at least in part on a parameter defined in the data model.

11. The system of claim 9, wherein the memory further includes computer-executable instructions that, as a result of being executed by the one or more processors, cause the system to obtain data associated with the device based at least in part on a parameter defined in the data model.

12. The system of claim 5, wherein the memory further includes computer-executable instructions that, as a result of being executed by the one or more processors, cause the system to determine a set of fields included in the bitstream based at least in part on an encoding schema associated with the device identifier, where a first subset of bits of the bitstream corresponds to a first field of the set of fields and a second subset of bits of the bitstream corresponds to a second field of the set of fields.

13. A non-transitory computer-readable storage medium storing thereon executable instructions that, as a result of being executed by one or more processors of a computer system, cause the computer system to:
obtain a first set of values representing one or more attributes of a device;
generate, based on the first set of values, a second set of values encoded according to a first encoding schema, wherein one or more values of the second set of values indicate a version of the first encoding schema;
generate, based on the second set of values, a device identifier that reversibly encodes the first set of values using a second encoding schema that is different from the first encoding schema, wherein the device identifier comprises a symbol of an alphabet that is selected from within the second encoding schema based, at least in part, on human readability of the device identifier; and
in response to receiving information that indicates the device identifier, cause data generated by at least one component of the device to be modified based, at least in part, on the response that indicates the device identifier.

14. The non-transitory computer-readable storage medium of claim 13, wherein the selection of the one or more symbols comprises binary-to-text conversion.

15. The non-transitory computer-readable storage medium of claim 13, wherein the one or more attributes of the device include at least one of:
a version field, an entity field,
a project field, a model field,
a device field, a batch field,
a manufacturer field,
a date field,
a location field, or
a slot field.

16. The non-transitory computer-readable storage medium of claim 13, wherein the instructions that cause the computer system to obtain the first set of values further include instructions that cause the computer system to obtain a set of integer values.

17. The non-transitory computer-readable storage medium of claim 13, wherein the instructions further comprise instructions that, as a result of being executed by the one or more processors, cause the computer system to generate a machine readable representation of the device identifier.

18. The non-transitory computer-readable storage medium of claim 13, wherein the device identifier further comprises a human readable string value.

19. The non-transitory computer-readable storage medium of claim 13, wherein the instructions further comprise instructions that, as a result of being executed by the one or more processors, cause the computer system to decode the device identifier based at least in part on the second encoding schema to obtain the second set of values.

20. The non-transitory computer-readable storage medium of claim 19, wherein the instructions further comprise instructions that, as a result of being executed by the one or more processors, cause the computer system to:
obtain the first set of values from the second set of values based at least in part on the first encoding schema; and obtain device information based at least in part on a first value of the first set of values.

\* \* \* \* \*